United States Patent Office 3,461,352
Patented Aug. 12, 1969

3,461,352
CAPACITY LEVEL SWITCHES
Arthur Worland, Gatley, England, assignor to Fielden Electronics Limited, Wythenshawe, England, a British company
Filed Sept. 28, 1964, Ser. No. 399,810
Claims priority, application Great Britain, Oct. 2, 1963, 38,743/63
Int. Cl. H01h 47/12, 47/32
U.S. Cl. 317—146
3 Claims

ABSTRACT OF THE DISCLOSURE

A capacity level switch system provided with an electrode and a capacitance sensitive circuit determinative of the rate of change of the capacitance of the electrode. This circuit comprises a self-excited oscillator which includes the electrode capacitance and another capacitance, such that the output amplitude of the oscillations vary according to the change in the capacity and produces a signal proportional to the rate of change of the electrode capacitance, and a time delay circuit is connected to the oscillator to provide a feedback in a sense to cause a variation in the capacitance tending to eliminate the effect of slow variations in electrode capacitance on the output signal.

---

This invention relates to capacity level switches.

The use of a capacity sensitive circuit for level indication or control is now widely established. Such devices comprise in general, an electronic circuit which is adjusted to produce a predetermined output current at one value of capacitance and a different output current at some other value of capacitance. The changes in the values of capacitance being produced by the material whose level is to be indicated or controlled approaching or covering an electrode and hence changing its capacitance by the change of dielectric constant within its electro-static field.

Such a device has the limitation that as the change of capacitance is relatively small, it must operate at high sensitivity and it can give a misleading indication from other slow changes of the value of capacitance due to such as, temperature variations, material build-up on the electrode, long term drifts in the measuring circuit and ageing of active components. The accumulation of such changes has necessitated the re-adjustment of the device from time to time and limited the operational sensitivity that could safely be used.

An object of the present invention is to provide an improved device which is relatively insensitive to long term changes in capacitance but is relatively highly sensitive to changes caused by movement of material in the vicinity of the electrode.

According to the invention, a capacity level switch arrangement comprises an electrode, a capacitance sensitive circuit associated with the electrode, and means for producing an output signal proportional to the rate of change of capacitance at the electrode so that an indication, alarm or control circuit is operated when the rate of change exceeds a predetermined value.

With such an arrangement, the output of the capacitance sensitive circuit can vary over a wide limit, due to all the above mentioned variations without operating the indication, alarm or control circuit provided that such variations are slow. However, as soon as the capacitance variation is above the predetermined rate the gain of the system is increased, producing a derivative signal of sufficient amplitude to operate an alarm circuit or the like. Such a circuit may be made bi-stable using the changing sign of the derivative signal according to whether the electrode capacity is increasing or decreasing, that is according to whether the level of the material is increasing or decreasing.

Embodiments of the invention will now be described with reference, by way of example, to the accompanying drawings, in which.

Figure 1:
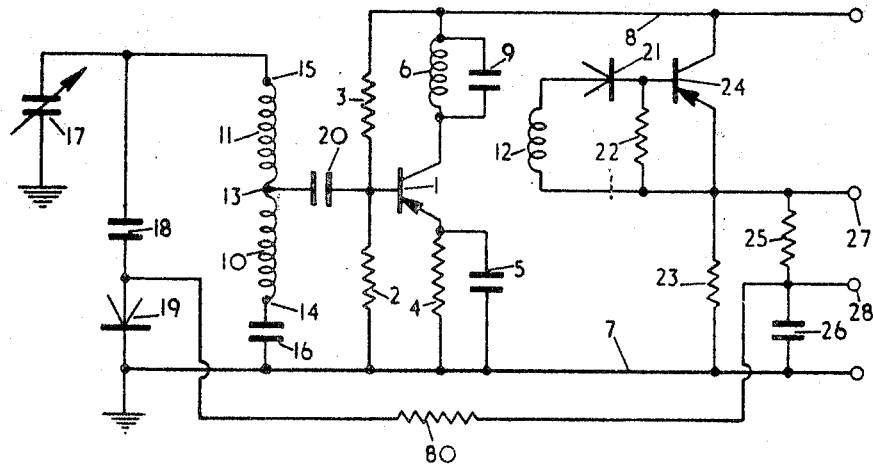
FIGURE 1 is a circuit diagram of an arrangement in accordance with the invention which provides a voltage output dependent on the rate of change of the capacity input.

Referring to FIGURE 1, transistor 1 is biassed into a class A working point by resistors 2, 3, and 4 with resistor 4 decoupled for A.C. by capacitor 5. The collector D.C. circuit is completed by inductance 6, the whole stage being energised by supply lines 7 and 8. Inductance 6 is resonated to a suitable frequency by capacitor 9 and is inductively coupled to three further inductances 10, 11 and 12. Inductances 10 and 11 are joined at junction 13 so that the E.M.F. between outer point 14 and junction 13 is additive with the E.M.F. between junction 13 and outer point 15. Outer point 14 is connected to earthed supply rail 7 by a capacitor 16 and outer point 15 is similarly connected to earthed supply rail 7 by the variable capacitance input to be observed such as that of a probe or electrode and represented as 17 and a capacitor 18 and a diode 19 in series. Junction 13 is also connected to the base of transistor 1 by a capacitor 20. When the capacitance input 17 is varied the A.C. potential of junction 13 with respect to supply line 7 will vary if a potential between points 14 and 15 exists and its phase will change when passing through zero. As inductances 10 and 11 are linked to the output of transistor 1 by inductive coupling to inductance 6 the input to transistor 1 can be adjusted by variation of capacitance input 17 to sustain any amplitude of oscillation from zero to maximum.

The induced signal at inductance 12 is rectified by a diode 21 and passed to a D.C. amplifying stage consisting of resistors 22 and 23, and a transistor 24. Across resistor 23 is an R.C. series circuit of resistor 25 and capacitor 26, the junction between resistor 25 and capacitor 26 being connected to the junction between capacitor 18 and diode 19 via resistor 80. Diode 19 is a silicon junction diode which has a low leakage current and when biassed in a non-conducting direction behaves largely as a capacitor whose capacitance is dependend upon its bias potential. The D.C. bias potential of diode 19 is the voltage developed across capacitor 26 except for any slight drop across resistor 80 due to the leakage of diode 19. By examination of the circuit it will be seen that the potential of capaictor 26 is the approximate time integral of the output potential of transistor 24 and that the output potential of transistor 24 is dependent upon the oscillation amplitude of transitor 1 via the inductive link between inductances 6 and 12. It has been described that the oscillation amplitude of transistor 1 can be controlled by variation of capacitance input 17 and it will be seen that the capacitance formed by capacitor 18 and diode 19 in series is in parallel with capacitance input 17 so that any variation in the capacitance of the capacitor 18 and diode 19 combination will equally vary the amplitude of oscillation of transistor 1. The circuit is so poled that any variation of transistor 24 output potential due to variation in amplitude of oscillation of transistor 1 will, when transferred to diode 19 via the combination of resistors 25 and 80 and capacitor 26, change the capacitance of diode 19 in the direction that will oppose the initiating change of amplitude. The overall effect of this arrangement is related to the rate of change of capacitance input and the time constant of resistor 25 and capacitor 26. If this time constant is zero then the opposition is instantaneous and if without the feedback via transistor 24 it required a certain capacitance change of input 17 to change the amplitude of oscillation of transistor 1 from zero to maximum it will now require X times that change in the presence of instantaneous feedback, where X is a factor dependent on the coefficient of capacitance change with voltage of diode 19 and any aperiodic attenuation of the feed-back voltage that might be included. In this way the dynamic range of the circuit between the two saturation states corresponding to zero and maximum oscillation measured in terms of input capacitance change has been increased by a factor of X. If however the time constant of resistor 25 and capacitor 26 is long compared with the time for input capacitance changes to occur, the dynamic range will remain as before and the sensitivity of output volts at transistor collector 24 for input capacitance change at 17 will be as high as the arrangement without feedback. The addition of feedback of long time constant in accordance with the invention allows input 17 to vary slowly without causing a large corresponding change of oscillation amplitude which would drive the circuit into saturation or near saturation conditions resulting in zero or low sensitivity to small but fast changes of capacity. If the voltage across resistor 25 is used as output at terminals 27 and 28 then this output is to a first order proportional to the rate of change of the input capacity within the parameters determined by the circuit constants.

Capacitor 18 forms a potentiometer with the capacitance of diode 19, reducing the oscillating potential across diode 19. Capacitor 18 is therefore selected so that peak oscillating potential does not exceed the applied reverse bias and rectification does not take place. Resistor 80 isolates the oscillatory potential across diode 19 from capacitor 26. Whether an increase of input capacitance causes an increase of amplitude of oscillation or a decrease can be selected by interchange of circuit positions of input capacitance 17 and capacitor 16. The circuit is so arranged that an increase of oscillation amplitude results in an increase of reverse bias to diode 19.

Having obtained at terminals 27 and 28 a signal proportional to the rate of change of input capacitance two basic signalling circuits can be used; one indicating the direction of change of the input capacity and the other responsive to absence or presence of changes above a certain rate. The first may be used in such cases as level indication or control when the level of the material would cause a comparatively fast increase or decrease of capacity of a capacity probe according to whether the material was approaching or receding from the probe. The second would be used in such cases as flow indicators where the material passing the capacity probe has a discrete structure relative to the size of the probe and movement would result in continuing changes of capacitance in either direction but stationary material around the probe or absence of material around the probe would have no continuing change of capacitance at the rate selected for operation of the signalling device.

Figure 2:
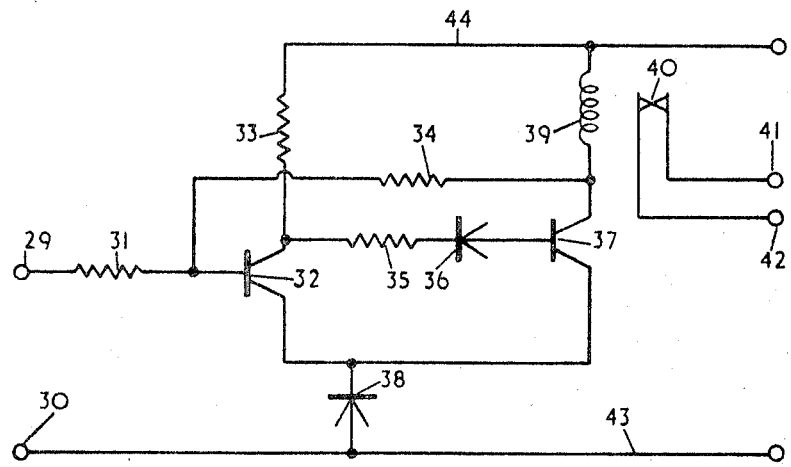
FIGURE 2 is a circuit diagram of a bistable circuit requiring opposing polarity of inputs to change from either of the two states.
Figure 3:
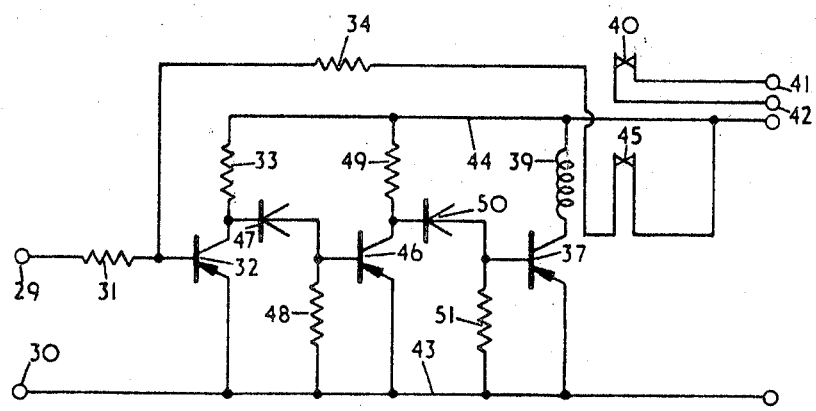
FIGURE 3 is a circuit diagram of another bistable circuit.
Figure 4:
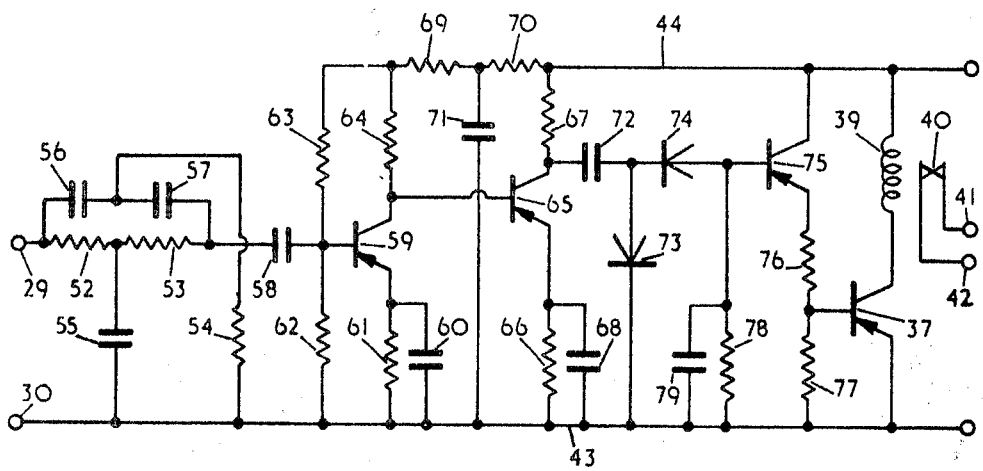
FIGURE 4 is a circuit diagram of an arrangement for energising a relay in the presence of variations of either direction of polarity.

Examples of signalling circuits that can be used are given in FIGURES 2, 3 and 4.

Referring to FIGURE 2, the transistors 32 and 37 are cross coupled such that a stable state exists if either transistor is conducting. If transistor 32 is in the cut-off condition all current passing through a resistor 33 will be base drive current to transistor 37 and the circuit is so poled and the values chosen such that this base current fully drives transistor 37, so that its collector-emitter potential is at a minimum. Any base drive of transistor 32 due to the collector-emitter potential of transistor 37 via a resistor 34 will be offset by the reverse drive from a diode 38 via input circuit terminals 29 and 30 when closed by an input circuit with a resistive path and resistor 31. This then is a stable condition of transistor 32 cut-off and transistor 37 hard-on, and this condition will be maintained until an override signal in the form of base drive to transistor 32 is provided. This base drive can be obtained from the input circuit. When transistor 32 starts to conduct the base drive of transistor 37 through resistor 33 is diverted through transistor 32 and diode 38. When this reduction of base drive to transistor 37 causes a reduction of collector current of transistor 37 further base drive to transistor 32 is diverted via a resistor 34 causing transistor 32 to saturate and reduce its collector-emitter potential to go to a minimum value. This minimum value is not sufficient to drive the base of transistor 37 via resistor 35 and diode 36. There is thus provided the other stable state of transistor 32 hard-on and transistor 37 cut-off even though the input that caused the change over was only of a transistory nature. To cause the circuit to return to its original state a momentary reverse base drive to transistor 32 greater than that flowing in resistor 34 must be obtained from input at terminals 29 and 30. If a signalling device such as a relay 39 with contacts 40 is included in the collector circuit of transistor 37 then either of the two stable conditions can be indicated at output terminals 41 and 42 connected to contacts 40. The circuit is supplied by supply lines 43 and 44.

When the circuit of FIGURE 1 is combined with the circuit of FIGURE 2 by connecting output terminals 27 and 28 to input terminals 29 and 30 the output signals of opposite polarity at terminals 27 and 28 resulting from small fast changes of input capacity either increasing or decreasing will provide the two signals necessary to change the circuit of FIGURE 2 from either of its two stable states and will always indicate the direction of the last change which occurred above the rate of change selected for operation by choice of circuit values.

FIGURE 3 shows an alternative arrangement of FIGURE 2, where the latching mechanism of the stable state is provided by additional contacts 45 on relay 39. The input transistor 32 is followed by a stage consisting at transistor 46, diode 47 and resistors 48 and 49. If transistor 32 is fully conducting, then transistor 46 is cut off and when transistor 32 is cut off transistor 46 is fully conducting. The output of transistor 46 is coupled to transistor 37 by diode 50 and resistor 51. In this case when transistor 32 is cut off so then is transistor 37. A momentary signal at terminals 29 and 30 causing transistor 32 to conduct will energise relay 39 closing contacts 45 and this state will be maintained by the base drive to transistor 32 via resistor 34. To release the circuit from this condition an opposing drive via resistor 31 greater than that due to resistor 34 will be required from signal at terminals 29 and 30 and this state will be held when the drive via resistor 34 is interrupted by the opening of contacts 45 and when the input at terminals 29 and 30 returns to zero. This circuit is thus also responsive to inputs of the two polarities arising from input capacity increase or decrease as in the preceding circuit of FIGURE 2. If a further stage, making four in all, is required then normally closed instead of normally open contacts 45 must be used.

FIGURE 4 shows an arrangement that can be used when the presence of change in either direction is to be detected. Input from terminals 29 and 30 is fed via a bridged-T filter consisting of resistors 52, 53 and 54 and capacitors 55, 56 and 57, to the input of a transistor 59 with the aid of capacitors 58 and 60. Transistor 59 is biassed for class A working by resistors 61, 62 and 63 and resistor 64 acts as collector load. The filter is narrow band to reject the prevailing spurious pickup frequency, usually the supply main frequency. Alternating signals outside the filter rejection band are passed to and amplified by transistor 59 and further amplified by a transistor 65 associated with resistors 66 and 67 and a capacitor 68. Resistors 69 and 70 with a capacitor 71 act to decouple transistor 59 from the later stages. The A.C. output from transistor 65 is passed by a capacitor 72 to demodulating diodes 73 and 74 and the consequent unidirectional output across a resistor 78 is smoothed by a capacitor 79. The unidirectional signal is further amplified by a transistor 75 and used to drive the output stage transistor 37 via resistors 76 and 77. Relay 39 with contacts 40 to output terminals 41 and 42 is in the collector circuit of transistor 37. The operation of this circuit when combined with FIGURE 1 by interconnecting 27 and 28 to 29 and 30 is that relay 39 remains energised as long as the input capacitance 17 varies continuously in either direction and will drop out when capacitance 17 remains at any fixed value. Thus when used as a flow indicator the long term dynamic range covers variations of capacitance 17 of a probe arranged in the flowing material, from fully uncovered to fully covered by the flowing material. If the material remains stationary anywhere within this range the relay 39 will drop out. When the material is flowing at any level within probe fully uncovered or covered the variations due to discrete particle size will be passed at full gain to hold-in relay 39.

What is claimed is:

1. A capacity level switch system including a sensing electrode, a capacitance sensitive circuit for determining the rate of change in the capacitance of said electrode comprising a self-excited oscillator including the capacitance of said sensing electrode and further capacitance means, the output amplitude of oscillation varying according to capacity change, said further capacitance means being connected in parallel with the capacitance of said electrode and including a voltage dependent capacitance device, means for producing an output signal proportional to the rate of change of capacitance of said electrode, an amplifier means in the output of said oscillator, and a time delay circuit connected to said oscillator voltage dependent capacitance device to feed back to said latter device a voltage in a sense to cause variation of the capacitance thereof tending to eliminate the effect of slow variations of electrode capacitance on said output signal producing means.

2. A switch system as claimed in claim 1 wherein the voltage-dependent-capacitor device is a semi-conductor diode arranged to be operative in its non-conductive condition.

3. A switch system as claimed in claim 1 wherein the time delay circuit comprises a resistance-capacity network across one part of which is developed the delayed feedback voltage, and across another part of which is developed said output signal proportional to the rate of change of capacitance at the electrode.

References Cited

UNITED STATES PATENTS

| | | | |
|---|---|---|---|
| 2,492,388 | 12/1949 | Martin | 317—123 X |
| 3,034,022 | 5/1962 | Worland | 317—146 |
| 3,201,774 | 8/1965 | Uemura | 340—258 |
| 3,333,160 | 7/1967 | Gorski | 317—146 |

FOREIGN PATENTS 1,271,484  5/1959  France.

LEE T. HIX, Primary Examiner

U.S. Cl. X.R.

307—235, 236; 317—148; 331—66, 109, 117